US012710025B2

(12) United States Patent
Kumar et al.

(10) Patent No.: US 12,710,025 B2
(45) Date of Patent: Aug. 18, 2026

(54) MILD-HYBRID ELECTRIC VEHICLE (MHEV) EMISSIONS AFTERTREATMENT SYSTEM

(71) Applicant: SAUDI ARABIAN OIL COMPANY, Dhahran (SA)

(72) Inventors: Praveen Kumar, New Hudson, MI (US); David Cleary, West Bloomfield, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/887,579

(22) Filed: Sep. 17, 2024

(65) Prior Publication Data

US 2026/0078723 A1 Mar. 19, 2026

(51) Int. Cl.
*F02M 26/14* (2016.01)
*F01N 3/035* (2006.01)
(Continued)

(52) U.S. Cl.
CPC ............ *F02M 26/14* (2016.02); *F01N 3/035* (2013.01); *F01N 3/0814* (2013.01);
(Continued)

(58) Field of Classification Search
CPC ...... F01N 3/035; F01N 3/0814; F01N 3/0878; F01N 3/2013; F01N 3/2066;
(Continued)

(56) References Cited

U.S. PATENT DOCUMENTS 9,670,855 B2 6/2017 Dickson et al.
10,001,069 B2 6/2018 Shin
(Continued)

FOREIGN PATENT DOCUMENTS

CN 113646519 A 11/2021
DE 102008009089 A1 * 8/2009 ............ G01M 3/025
(Continued)

OTHER PUBLICATIONS

Gao, Zhiming et al., "Engine-Aftertreatment in Closed-Loop Modeling for Heavy Duty Truck Emissions Control"; Proceedings of the WCX SAE World Congress Experience; SAE Technical Paper 2019-01-0986; pp. 1-13; Apr. 2, 2019 (13 pages).
(Continued)

*Primary Examiner* — Patrick D Maines
(74) *Attorney, Agent, or Firm* — Osha Bergman Watanabe & Burton LLP

(57) ABSTRACT

A vehicle includes an engine, a battery, an exhaust line including an exhaust port, an after-treatment system, an EGR line, an EGR pump, and a NOx adsorber. The engine generates power from a combustion reaction that produces exhaust gases. The battery stores electrical power. The after-treatment system reduces Nitrogen Oxides (NOx) content in the exhaust gases. The EGR line recirculates exhaust gases from the exhaust line upstream of the after-treatment system. The EGR pump recirculates exhaust gases from the exhaust line downstream of the after-treatment system. The NOx adsorber captures and stores the NOx content from the exhaust gases. The NOx adsorber includes an adsorber inlet line and an adsorber outlet line connected to the exhaust line, and the exhaust line extends between the adsorber inlet line and the adsorber outlet line to bypass the NOx adsorber.

20 Claims, 10 Drawing Sheets

(51) Int. Cl.

| | |
|---|---|
| ***F01N 3/08*** | (2006.01) |
| ***F01N 3/20*** | (2006.01) |
| ***F02B 37/00*** | (2006.01) |
| ***F02M 26/07*** | (2016.01) |
| ***F02M 26/34*** | (2016.01) |

(52) U.S. Cl.
CPC ......... *F01N 3/0878* (2013.01); *F01N 3/2013* (2013.01); *F01N 3/2066* (2013.01); *F02B 37/00* (2013.01); *F02M 26/07* (2016.02); *F02M 26/34* (2016.02); *F01N 2410/12* (2013.01)

(58) Field of Classification Search
CPC .... F01N 2410/12; F02M 26/07; F02M 26/14; F02M 26/34; F02M 26/035; F02B 37/00
See application file for complete search history.

(56) References Cited

U.S. PATENT DOCUMENTS

| | | | | |
|---|---|---|---|---|
| 10,677,179 | B2 * | 6/2020 | Dixon | F02B 37/24 |
| 10,801,427 | B2 | 10/2020 | Han et al. | |
| 11,428,181 | B2 | 8/2022 | Brahma et al. | |
| 2010/0319320 | A1 * | 12/2010 | Mital | F01N 13/009 60/299 |
| 2021/0355862 | A1 | 11/2021 | Tufail et al. | |
| 2022/0341378 | A1 | 10/2022 | Miles et al. | |

FOREIGN PATENT DOCUMENTS

| | | | | | |
|---|---|---|---|---|---|
| DE | 102020116160 | B3 | * | 9/2021 | |
| EP | 1870590 | A1 | * | 12/2007 | F02M 26/06 |
| ES | 2912746 | T3 | * | 5/2022 | F01N 3/032 |
| GB | 2418377 | A | * | 3/2006 | B01D 53/86 |
| JP | H10176523 | A | * | 6/1998 | |
| JP | 11132029 | A | * | 5/1999 | |
| JP | 2000110553 | A | * | 4/2000 | |
| WO | WO-2008025406 | A1 | * | 3/2008 | F02M 26/47 |
| WO | 2021/155088 | A1 | | 8/2021 | |

OTHER PUBLICATIONS

Kumar, Praveen et al., “E-Heater Performance for Aftertreatment Warm-Up in a 48V Mild-Hybrid Heavy-Duty Truck over Real Driving Cycles”; Energies; vol. 17, Issue 12, Article 3001; pp. 1-22; Jun. 2024 (22 pages).
Zhao, Junfeng et al., “Integrated Model Predictive Control of Hybrid Electric Vehicles Coupled with Aftertreatment Systems”; IEEE Transactions on Vehicular Technology; vol. 65, Issue 3; pp. 1199-1211; Mar. 2016 (13 pages).
García, Antonio et al., “Emissions reduction by using e-components in 48 V mild hybrid trucks under dual-mode dual-fuel combustion”; Applied Energy; vol. 299, Article 117305; pp. 1-18; Oct. 1, 2021 (18 pages).
Fnu, Dhanraj et al., “Application of 48V Mild-Hybrid Technology for Meeting GHG and Low NOx Emission Regulations for MHD Vehicles”; Proceedings of the WCX SAE World Congress Experience; SAE Technical Paper 2023-01-0484; pp. 1-16; Apr. 11, 2023 (16 pages).

* cited by examiner

MILD-HYBRID ELECTRIC VEHICLE (MHEV) EMISSIONS AFTERTREATMENT SYSTEM

BACKGROUND

Stringent emissions requirements imposed on vehicles by government authorities require advancements in engine thermal efficiency and emissions after-treatment systems. As a result, low-NOx engine combustion concepts are being pursued for their environmental benefits. Hybrid vehicle concepts including both a combustion engine and a battery providing electrical power are also a heavily pursued option for reducing vehicle emissions. Because both concepts serve similar purposes of reducing vehicle emissions, it is desirable to combine the concepts of low-NOx combustion and vehicle hybridization to aid in meeting the aforementioned emission requirements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A vehicle includes an engine, a battery, an exhaust line, an after-treatment system, an EGR line, an EGR pump, and a NOx adsorber. The engine generates power from a combustion reaction that produces exhaust gases. The battery stores electrical power. The exhaust line includes an exhaust port that delivers the exhaust gases from the engine to an external environment of the vehicle. The after-treatment system reduces Nitrogen Oxides (NOx) content in the exhaust gases. The EGR line is fluidly coupled to an inlet portion of the exhaust line disposed upstream of the after-treatment system, and recirculates a first portion of the exhaust gases from the inlet portion of the exhaust line. The EGR pump includes an inlet line fluidly coupled to an outlet portion of the exhaust line disposed downstream of the after-treatment system such that the EGR pump recirculates a second portion of the exhaust gases from the outlet portion of the exhaust line. The NOx adsorber is fluidly coupled to the outlet portion of the exhaust line and captures and stores the NOx content from the exhaust gases. The NOx adsorber includes an adsorber inlet line fluidly connected to the outlet portion of the exhaust line and an adsorber outlet line fluidly connected to the outlet portion of the exhaust line. The outlet portion of the exhaust line extends between the adsorber inlet line and the adsorber outlet line to bypass the NOx adsorber.

A method for operating a vehicle includes storing electrical power with a battery. The method further includes generating power from a combustion reaction with an engine, thereby producing exhaust gases. A first portion of the exhaust gases is recirculated from an inlet portion of an exhaust line with an EGR line. An after-treatment system reduces Nitrogen Oxides (NOx) content in the exhaust gases. The inlet portion of the exhaust line is disposed upstream of the after-treatment system and an outlet portion of the exhaust line is disposed downstream of the after-treatment system. The method also includes capturing and storing NOx content from the exhaust gases with a NOx adsorber fluidly coupled to the outlet portion of the exhaust line. The NOx adsorber includes an adsorber inlet line fluidly connected to the outlet portion of the exhaust line and an adsorber outlet line fluidly connected to the outlet portion of the exhaust line. The outlet portion of the exhaust line extends between the adsorber inlet line and the adsorber outlet line to bypass the NOx adsorber. The method additionally includes recirculating a second portion of the exhaust gases from the outlet portion of the exhaust line with an EGR pump. The exhaust gases are delivered to an external environment of the vehicle with an exhaust port of the exhaust line.

Any combinations of the various embodiments and implementations disclosed herein can be used in a further embodiment, consistent with the disclosure. Other aspects and advantages of the claimed subject matter will be apparent from the following description and the claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards a Mild-Hybrid Electric Vehicle (MHEV). The MHEV includes subsystems such as a low Nitrogen Oxides (NOx) combustion Heavy Duty (HD) engine, an Electric Exhaust Gas Recirculation (eEGR) pump, a NOx adsorber catalyst, and an Electric Heater (EH) integrated at a Selective Catalytic Reduction (SCR) system. Multiple configurations of the subsystems are proposed with the objective of mitigating tailpipe NOx emissions slip and accelerating heating of the SCR catalyst the warmup during cold ambient operation. The configurations have differing exhaust gas return locations from the eEGR pump, which comes with separate advantages and disadvantages.

Figure 1:
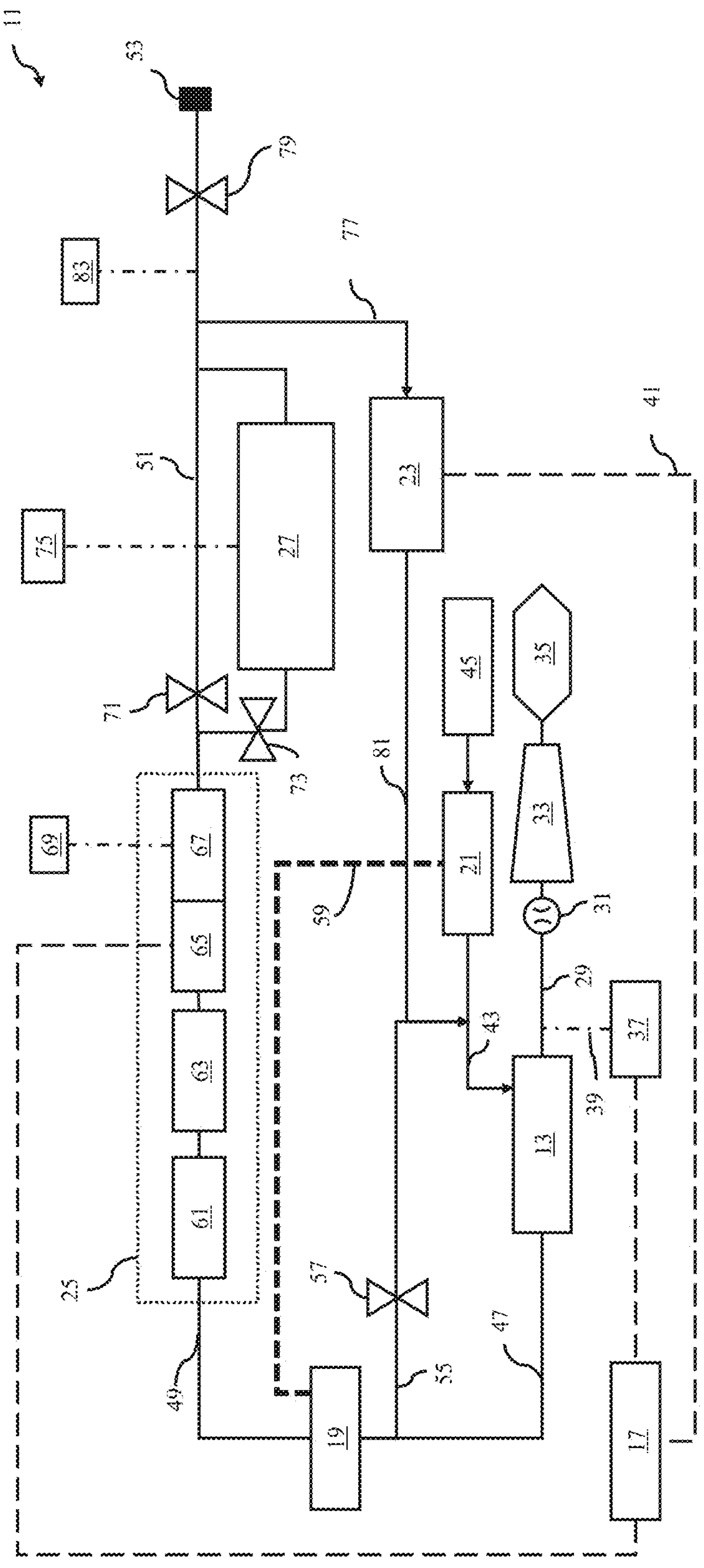
FIG. 1 depicts a block diagram of a Mild-Hybrid Electric Vehicle (MHEV) in accordance with one or more embodiments of the present disclosure.

FIG. 1 depicts an example of a Mild-Hybrid Electric Vehicle (MHEV) 11 in accordance with one or more embodiments of the present disclosure. The MHEV 11 includes a number of subsystems including, but not limited to, an Internal Combustion Engine (ICE) 13, a battery 17, a turbine 19, a compressor 21, an Electrical EGR (eEGR) eEGR pump 23, an after-treatment system 25, and a Nitrogen Oxide (NOx) adsorber 27, which are each discussed further below.

The ICE 13 is formed as a low output NOx Heavy Duty (HD) diesel engine. As used herein, the phrase "low output NOx" refers to a NOx output of less than 2.5 grams (g) per kiloWatt-hour (kWh). The phrase "heavy duty" refers to a diesel engine for a vehicle having a Gross Vehicle Weight Rating (GVWR) of 10,000 pounds (~4,535 kilograms (kg)). The ICE 13 may have six or more cylinders (not shown) that combust diesel fuel to produce power in a crankshaft 29, where the crankshaft 29 is a power output shaft of the engine. HD diesel engines such as the ICE 13 typically have a power output of 400 or more horsepower (hp). The above values describing outputs of the ICE 13 are provided for illustrative purposes only, and are not intended to constrain the particular type of engine that may be utilized in the MHEV 11. In other embodiments, the MHEV 11 may include a compression ignition gasoline engine, a spark ignition gasoline engine, a combination thereof, a light duty diesel engine, or similar engine designs as will be appreciated by a person having ordinary skill in the art.

The crankshaft 29 is connected to a transmission 33 by way of a clutch 31. The clutch 31 serves to disconnect crankshaft 29 from the transmission 33, allowing the ICE 13 to operate without imparting motion to the transmission 33. The transmission 33 includes a plurality of gearing stages, and operates to convert engine torque to wheel speed. Based on the active gear used by the transmission 33, the output torque and speed produced by the ICE 13 are adapted to suit a torque request made by a driver of the MHEV 11. An output shaft of the transmission 33 is connected to an axle 35 that is connected to wheels (not shown) of the MHEV 11. Thus, power produced by the ICE 13 is passed by the clutch 31 to the transmission 33, which adapts the torque and speed provided to the axle 35, and thus the wheels.

Electric power forming the hybrid portion of the MHEV 11 is provided by way of the battery 17. The battery 17 may be formed with a lithium-ion composition, a lead acid composition, a nickel-metal hydride composition, or equivalent energy storage compositions, and may have a capacity of approximately 6.8 kWh. The battery 17 stores power provided by a charging device (not shown) such as a charging station or a wall mounted power pack, or recovered by an Integrated Starter Generator (ISG) 37 electrically connected to the battery 17.

The ISG 37 combines the traditional features of an electric starter and a generator in a single package. Thus, the ISG 37 provides two functions. As a first function, the ISG 37 provides torque to the crankshaft 29 of the ICE 13, causing the ICE 13 to turn over and begin an ignition cycle. As a second function, the ISG 37 captures excess rotational energy from the crankshaft 29 and converts the rotational energy into electrical power returned to the battery 17. The ISG 37 is formed of a magnetized shaft (not shown, connected to the crankshaft 29) that rotates within a coil of wire (not shown) to produce electricity or generate rotational motion. That is, when the ISG 37 is performing functions of starting the ICE 13, the ISG 37 acts as a motor that converts electrical power into rotational motion. When the MHEV 11 is in motion and the ICE 13 is operational, the ISG 37 functions as a generator to capture rotational energy from the crankshaft 29 and return the captured energy as electrical power to the ICE 13.

The ISG 37 is connected to the crankshaft 29 by way of a gear 39. The gear 39 is rigidly fixed to the magnetized shaft of the ISG 37 and meshes with a splined portion of the crankshaft 29. Such an arrangement is commonly referred to as a "P1 powertrain configuration" in the field of automotive engineering. The ISG 37 is connected to the battery 17 by a power connection 41. The power connection 41 is formed from copper, aluminum, or an equivalent conducting material that transmits high voltage and/or amperage electricity throughout the MHEV 11. The power connection 41 may further include harnesses or connectors (not shown) providing a convenient mechanism for connecting the power connection 41 to the components discussed above.

Continuing with FIG. 1, the ICE 13 receives air from an air inlet line 43. The air inlet line 43 is formed as a metal manifold that distributes air to each cylinder (not shown) of the ICE 13. Thus, the air inlet line 43 includes a single inlet and multiple outlets, where the outlets individually connect to the cylinders of the ICE 13. The inlet of the air inlet line 43 is connected to a compressor 21, which is discussed further below. Briefly, the compressor 21 forms one side of a Variable Geometry Turbocharger (VGT), and includes vanes that serve to compress air received from an air intake 45. The air intake 45 is a flexible hose or tubing that connects to the transmission 33 at one end and is open to receive air from the ambient environment of the MHEV 11 at its other end.

Exhaust emissions created by the combustion reactions in the ICE 13 are passed to an exhaust line. The exhaust line is depicted in three sections in FIGS. 1-4, the three sections including an exhaust inlet 47, an exhaust midsection 49, and an exhaust outlet 51. The exhaust inlet 47 extends from the ICE 13 to the turbine 19 to form an inlet portion of the exhaust line. The exhaust midsection 49 extends from the turbine 19 to the after-treatment system 25 to form a midsection of the exhaust line. The exhaust outlet 51 extends from the after-treatment system 25 to an exhaust port 53 to form an outlet portion of the exhaust line. Thus, the exhaust inlet 47 may be embodied as an exhaust manifold or exhaust plenum that condenses the exhaust streams from each cylinder (not shown) into a single unified exhaust stream. The exhaust midsection 49 is a pipe including a single inlet attached to the turbine 19, and a single outlet attached to the exhaust midsection 49. The exhaust port 53 is formed as an orifice, or tailpipe, located at a distal end of the exhaust line such that the exhaust line is in fluid communication with the ambient environment. Each of the sections of the exhaust line (i.e., the exhaust inlet 47, the exhaust midsection 49, and the exhaust outlet 51) are formed as metal piping or ducting that facilitates the transfer of exhaust gases from the ICE 13 to the ambient environment of the MHEV 11.

As shown in FIG. 1, an EGR line 55 branches from the exhaust inlet 47 to recycle exhaust gases from upstream of the turbine 19. The EGR line 55 is formed as a metal pipe similar to the exhaust line sections discussed above. The junction between the EGR line 55 and the exhaust inlet 47 may be embodied as a T-joint or Y-joint, or equivalent junction or joint without departing from the nature of this disclosure. The EGR line 55 includes an EGR valve 57, and the EGR valve 57 is embodied as a diaphragmatic valve or a butterfly valve without departing from the nature of this disclosure. When open, the EGR valve 57 allows fluid communication between the exhaust inlet 47 and the air inlet line 43, and the EGR valve 57 prevents fluid communication (e.g., exhaust gas transfer) between the exhaust inlet 47 and the air inlet line 43 when closed. The EGR line 55 may connect to the eEGR outlet line 81 in order to transmit exhaust gases to the air inlet line 43, or connect directly to the air inlet line 43 without departing from the nature of this disclosure.

Still continuing with FIG. 1, exhaust gases that are not returned to the air inlet line 43 via the EGR line 55 are used to rotate the turbine 19. The turbine 19 forms the remaining side of the VGT, and the turbine 19 and the compressor 21 are connected by a shaft 59, which is a metal rod rigidly attached to each of the turbine 19 and the compressor 21. The turbine 19 includes vanes that are actuated by the exhaust gases, which causes the shaft 59 to rotate therewith. The rotation of the shaft 59 causes the compressor 21 to rotate as well, drawing in and compressing air from the air intake 45. The compressed air is subsequently fed into the ICE 13 via an air inlet line 43, such that the VGT formed by the turbine 19 and the compressor 21 compresses intake air using power siphoned from the exhaust gases. As used herein, the term "variable geometry" of the phrase "variable geometry turbocharger" refers to the turbine 19 and the compressor 21 including adjustable vanes (not shown) that are capable of creating different aspect ratios (A/R ratio) to vary the fluid flow properties therethrough. That is, the adjustable vanes of the turbine 19 may be actuated to increase or decrease the rate of actuation of the turbine 19 from the exhaust gases, and a similar process may be applied to the adjustable vanes of the compressor 21.

Once the exhaust gases have passed through the turbine 19 the exhaust gases are transferred, with the exhaust midsection 49, to the after-treatment system 25. The after-treatment system 25 is formed of a plurality of exhaust gas treatment devices including, but not limited to, a Diesel Oxidation Catalyst (DOC) 61, a Diesel Particulate Filter (DPF) 63, an electric heater 65, and a Selective Catalytic Reduction (SCR) catalyst 67. The DOC oxidizes Carbon Monoxide (CO), hydrocarbons, and other pollutants in the exhaust gases, and may include a substrate coated in a metal catalyst. The DPF 63 removes soot from the exhaust gases, and may be embodied as a wall-flow diesel particulate filter. The DPF 63 may be reusable or single-use, and may include a catalyst or fuel burner (not shown) that burns off soot from the exhaust gases. The SCR catalyst 67 converts the NOx in the exhaust gases into diatomic Nitrogen ($N_2$) and water ($H_2O$). The SCR catalyst 67 utilizes aqueous urea (also known as Diesel Exhaust Fluied (DEF)), ammonia ($NH_3$), or an equivalent reduction agent and a includes a catalytic conversion device formed from a support material such as Titanium Oxide ($TiO_2$) and a catalyst such as Vanadium (V), Molybdenum (MO), and/or Tungsten (T).

The electric heater 65 converts power provided by the battery 17 into heat in order to raise a temperature of the SCR catalyst 67. As shown in FIG. 1, the electric heater 65 receives power from the battery 17 via power connection 41. The electric heater 65 may be embodied as an SCR tank heater or a heated SCR hose consistent with one or more embodiments of the invention as presented in this disclosure. The temperature of the SCR catalyst 67 is monitored by an SCR catalyst temperature sensor 69, which is a thermistor, thermocouple, or infrared radiation thermometer that captures and transmits the temperature of the SCR catalyst 67 to an Electronic Control Unit (ECU) (e.g., FIG. 6) as discussed further below. Based upon the temperature of the SCR catalyst 67 as determined by the SCR catalyst temperature sensor 69, the ECU controls the duty cycle of the electric heater 65 in order to maintain the temperature of the SCR catalyst 67 above a manufacturer determined temperature threshold.

Exhaust gases that pass through the after-treatment system 25 have a reduced NOx content compared to exhaust gases upstream of the exhaust midsection 49. To further reduce NOx in the exhaust gases, the exhaust outlet 51 downstream of the after-treatment system 25 is fluidly coupled to the NOx adsorber 27. The NOx adsorber 27 includes an adsorber inlet line (e.g., FIG. 5) and an adsorber outlet line (e.g, FIG. 5) that are each fluidly coupled to the exhaust outlet 51. The exhaust outlet 51 further includes a back pressure valve 71, which is a butterfly valve that is actuated to control the amount of exhaust gases that travel through the exhaust outlet 51 bypassing the NOx adsorber 27. Depending on its aperture, the back pressure valve 71 fully or partially seals the exhaust outlet 51 to divert exhaust gases to the NOx adsorber 27.

The NOx adsorber 27 includes one or more NOx adsorption stages. Each NOx adsorption stage includes adsorption components that adsorb NO and $NO_2$ from exhaust gases during cold start conditions. The aforementioned adsorption components include, but are not limited to, NOx traps that include monolithic substrates sprayed with a Zeolite wash coat, or similar passive NOx adsorption principles. Each NOx adsorption stage has a limited capacity for NOx adsorption by virtue of the adsorption process itself, such that once the NOx adsorption stage is "full" or has reached its capacity no more NOx may be adsorbed. Thus, the number of stages included in the NOx adsorber 27 may vary depending on the contemplated use case of the MHEV 11 and the theoretical NOx output thereof, as further discussed below.

Desorption initiates beyond 150° C. (approximate) and a major NO release occurs up to 200° C. (approximate). The Zeolite wash coat structural integrity also mandates a maximum exhaust temperature limit of approximately 400° C. As a result, the location and temperature of the NOx adsorber 27 impacts the functionality thereof. As shown in FIG. 1, the NOx adsorber 27 is strategically placed downstream of the after-treatment system 25 to maximize heating of the DOC 61 and the DPF 63. This further allows the NOx adsorber 27 to receive exhaust gases downstream of the after-treatment system 25 at much colder temperatures to promote NOx adsorption and delay warming up of the NOx adsorber 27, which triggers desorption. In addition, the downstream NOx adsorber 27 location ensures that the SCR catalyst 67

Light-Off Time (LOT) occurs prior to reaching the desorption temperature threshold near 200° C.

Figure 5:
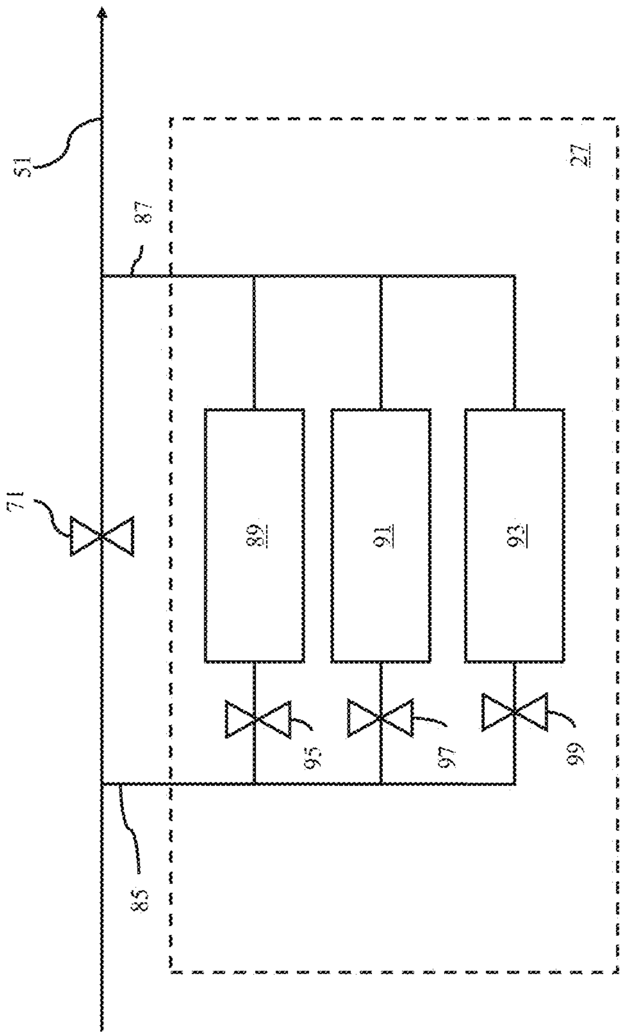
FIG. 5 depicts a block diagram of a multi stage NOx adsorber in accordance with one or more embodiments of the present disclosure.

The intake of exhaust gases into the NOx adsorber 27 is further facilitated by a adsorber control valve 73 such as a butterfly valve placed at the adsorber inlet line (e.g., FIG. 5). The back pressure valve 71 is positioned between the adsorber inlet line and the adsorber outlet line (e.g., FIG. 5). The arrangement of the back pressure valve 71 and the adsorber control valve 73, as well as the structures thereof, directs exhaust gases to flow into the NOx adsorber 27 when the adsorber control valve 73 is at least partially open and the back pressure valve 71 is at least partially closed. The temperature of each stage of the NOx adsorber 27 is monitored by corresponding adsorber temperature sensors 75, where each stage of the NOx adsorber 27 has an accompanying adsorber temperature sensor 75. The adsorber temperature sensors 75 may be embodied, for example, as thermistors or thermocouples disposed in or affixed to each NOx adsorption stage.

After passing through the NOx adsorber 27, the exhaust gases have low NOx content. The NOx content is measured by a NOx sensor 83 that is fluidly coupled to the exhaust outlet 51. The NOx sensor 83 includes a Nernst cell (or a control cell) positioned adjacent to a detection cell that includes a substrate (e.g., a ceramic support structure) and a wash coat (e.g., Rhodium), and compares the level of NOx of the control cell compared to the detection cell. In the event that the NOx sensor 83 outputs an increased NOx level to the ECU (e.g., FIG. 6), the ECU opens an additional NOx adsorption stage to continue reducing NOx emission content as discussed in relation to FIG. 5.

Downstream of the NOx adsorber 27, the exhaust gases are either fed to the external environment via an exhaust port 53 embodied as a tailpipe, or passed to the eEGR pump 23 via an eEGR inlet line 77. The eEGR inlet line 77 is fluidly coupled to the exhaust outlet 51. Downstream of the eEGR inlet line 77, the exhaust outlet 51 further includes a flow control valve 79, which is also embodied as a butterfly valve. When the flow control valve 79 is open, exhaust gases flow freely to the external environment and minimal or no exhaust gases are passed to the eEGR pump 23. On the other hand, when the flow control valve 79 is closed or partially closed, some or all of the exhaust gases are passed to the eEGR pump 23.

The eEGR pump 23 is a variable speed low pressure EGR pump that recycles low NOx exhaust gases from the exhaust outlet 51 to various portions of the MHEV 11. As shown in FIG. 1, an eEGR outlet line 81 fluidly connects the eEGR pump 23 to the air inlet line 43. The eEGR inlet line 77 and the eEGR outlet line 81 may be embodied as flexible or rigid hoses. The placement of the eEGR outlet line 81 causes the eEGR pump 23 to return low NOx exhaust gases to the ICE 13 intake, providing numerous benefits. As a first benefit, the increased dilution of the air-fuel mixture with the cold low NOx exhaust gases reduces flame temperatures and the air-fuel ratio of the ICE 13, leading to a dual benefit of lower NOx production and elevated exhaust gas temperatures, simultaneously. Further benefits of this configuration include increasing the total in cylinder dilution increases beyond levels achieved without the use of the eEGR pump 23. On the other hand, operating the eEGR pump 23 leads to lower cylinder temperature and lower NOx generation, while exhaust gases received by the turbine 19 have a higher temperature and higher turbine inlet enthalpy. The configuration of FIG. 1 further elicits a higher warmup temperature of the after-treatment system 25 by virtue of having an increased exhaust gas temperature.

In general, FIGS. 1-4 depict configurations of MHEVs 11 where the eEGR outlet line 81 is connected to different components. Components of FIGS. 2-4 retain the same numbering as components discussed in FIG. 1 to denote that the same or similar components are used in configurations corresponding to FIGS. 2-4 as those discussed in relation to FIG. 1. However, it will be appreciated to a person having ordinary skill in the art that many minor modifications may be made to the configurations of FIGS. 1-4 without departing from the nature of this disclosure, and various components may be replaced with suitable counterparts. Furthermore, descriptions of the structure and nature of various components discussed are not repeated below for the sake of brevity, except in cases where the structure or operating principle of the component has been modified.

Figure 2:
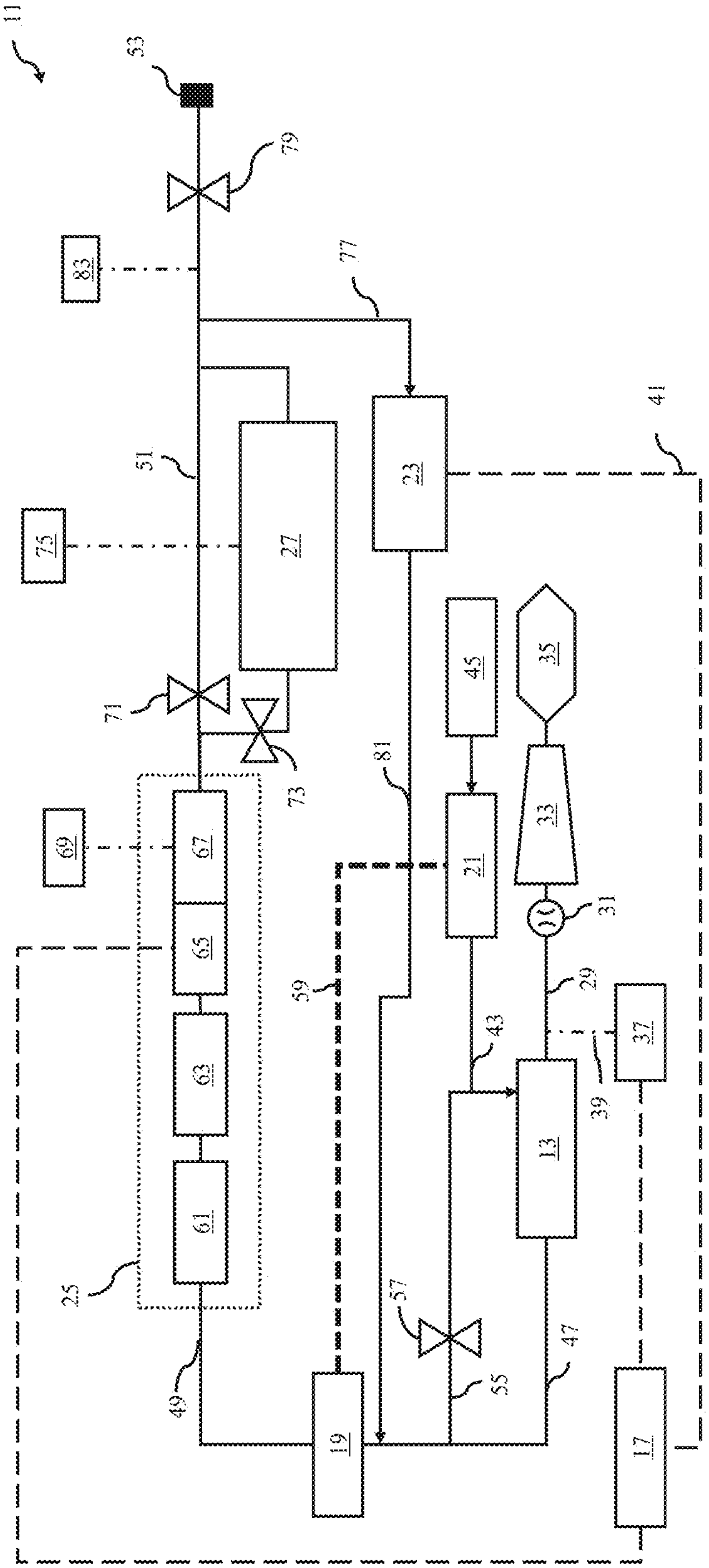
FIG. 2 depicts a block diagram of an MHEV in accordance with one or more embodiments of the present disclosure.

Turning to FIG. 2, FIG. 2 depicts an MHEV 11 having an eEGR outlet line 81 connected to the exhaust inlet 47 upstream of the turbine 19. In this configuration, the eEGR pump 23 directs the cold exhaust gases from the exhaust outlet 51, downstream of the NOx adsorber 27, to the exhaust inlet 47 upstream of the turbine 19. From a physical perspective, and noting that the exhaust inlet 47 may be formed as an exhaust manifold, the eEGR outlet line 81 may be adjoined to the single outlet of the exhaust manifold using a T-joint, for example. The eEGR pump 23 thus delivers additional cold exhaust gases to the turbine 19, allowing for additional control strategies for the VGT formed by the turbine 19 and the compressor 21. For example, when the eEGR pump 23 is operational and the VGT is relatively closed, total in-cylinder dilutions increase and turbine 19 inlet enthalpy improve simultaneously. On the other hand, if the eEGR pump 23 is off and the VGT is fully open, turbine 19 inlet enthalpy increases causing a higher volumetric engine flow. The increased volumetric engine flow further promotes heat transfer from the exhaust gases to the after-treatment system 25 during warmup from cold start conditions.

Figure 3:
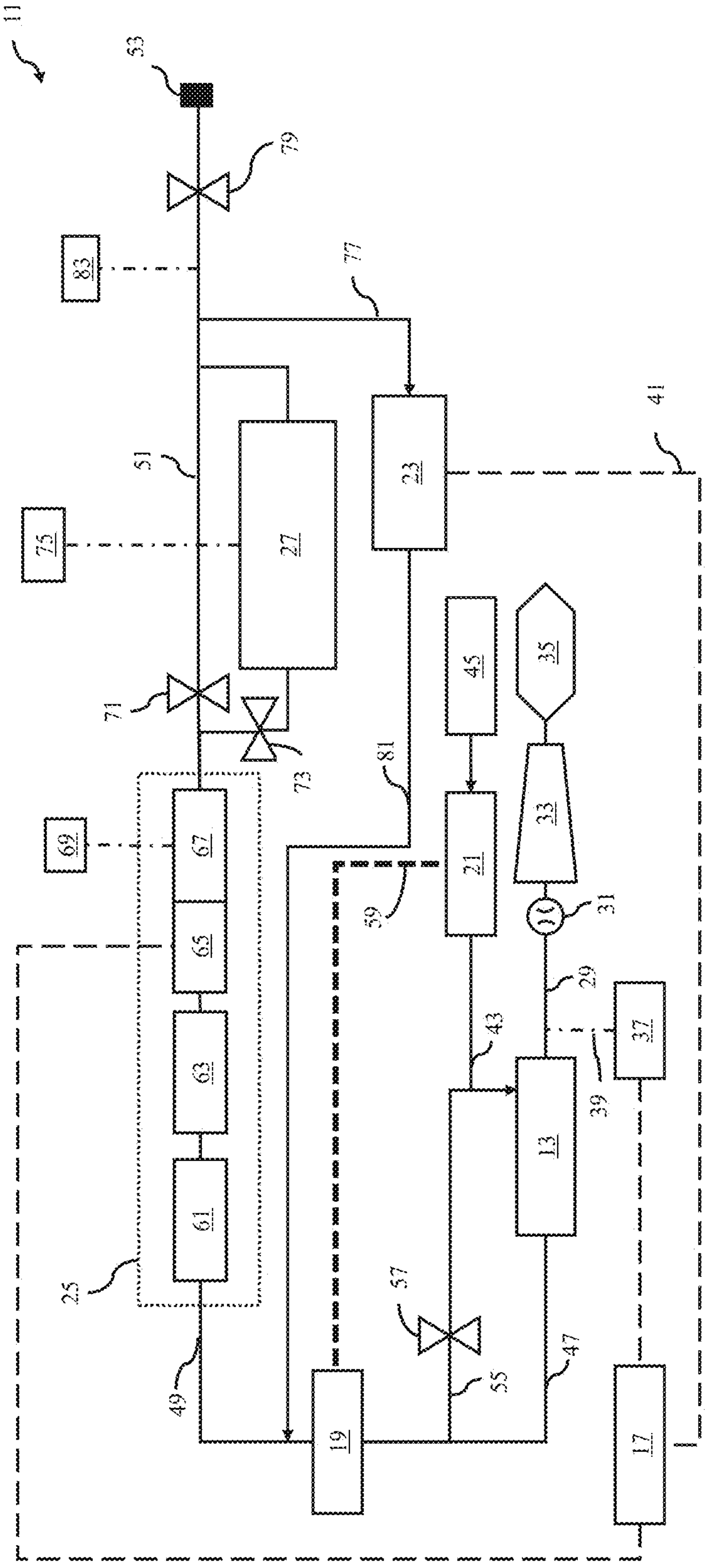
FIG. 3 depicts a block diagram of an MHEV in accordance with one or more embodiments of the present disclosure.

FIG. 3 depicts a configuration of the MHEV 11 where the eEGR outlet line 81 fluidly connects the eEGR pump 23 to the exhaust midsection 49. The eEGR outlet line 81 thus directs low NOx exhaust gases from the exhaust outlet 51 to the exhaust midsection 49 upstream of the after-treatment system 25 and downstream of the turbine 19. The fluid connection between the eEGR outlet line 81 and the exhaust midsection 49 may be embodied as a T-joint or Y-joint as discussed above. In this configuration, the eEGR pump 23 directs cold tail-pipe exhaust gases to downstream of the turbine 19, causing an accelerated heating of the DOC 61, the DPF 63, and the SCR catalyst 67. The turbine 19 operations upstream of the after-treatment system 25 are marginally impacted by the increased downstream exhaust pressure, as the outlet exhaust gas pressure of the turbine 19 is greater than that of the low NOx exhaust gases from the eEGR outlet line 81 to avoid backflow into the turbine 19. Control of the outlet exhaust gas pressure from the turbine 19 is determined, in part, by exerting control over the aperture of the vanes of the turbine 19 as discussed above.

Figure 4:
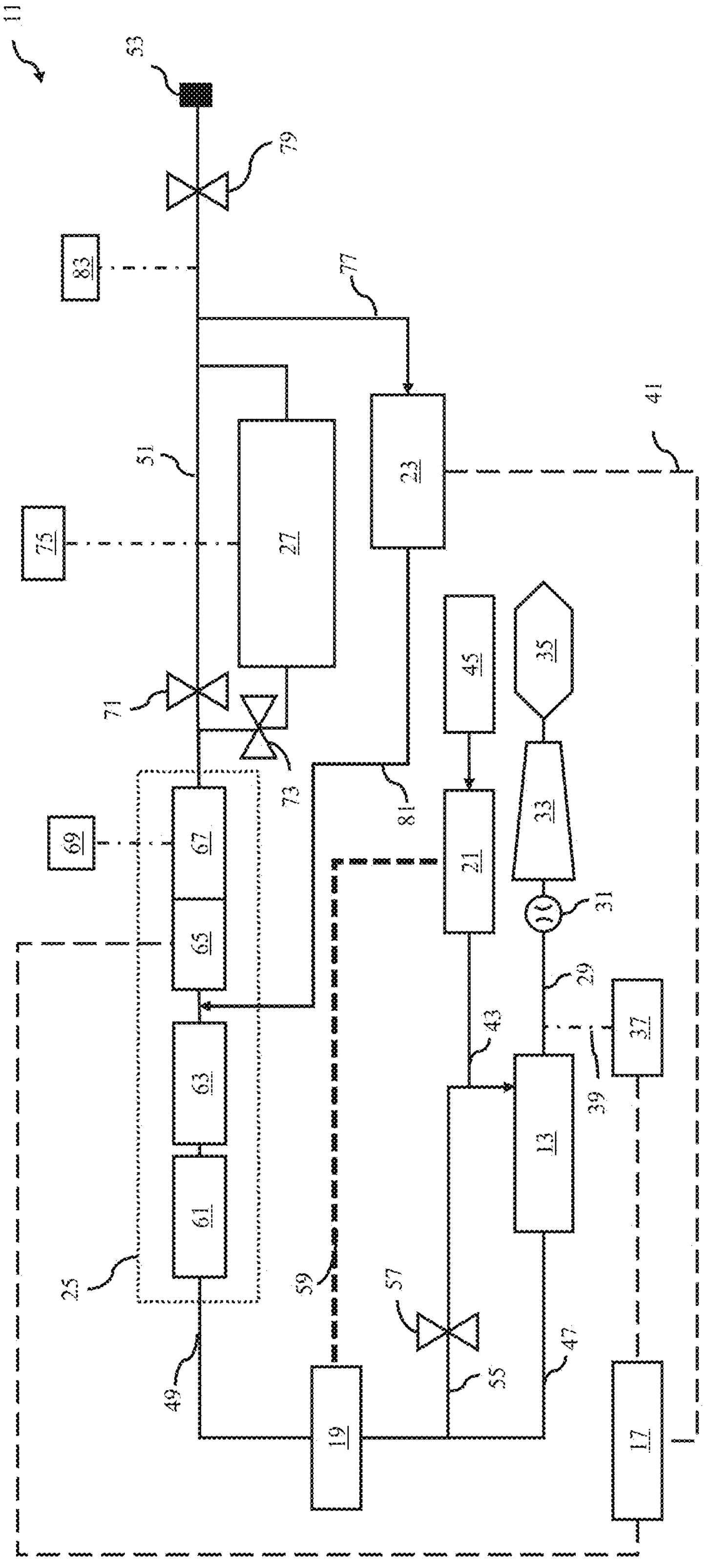
FIG. 4 depicts a block diagram of an MHEV in accordance with one or more embodiments of the present disclosure.

FIG. 4 depicts a configuration of the MHEV 11 where the eEGR outlet line 81 directs low NOx exhaust gases to the after-treatment system 25. In juxtaposition to FIG. 3, where low NOx exhaust gases are passed to the after-treatment system 25 upstream of the DOC 61, FIG. 4 presents an MHEV 11 configuration where the low NOx exhaust gases are passed from the eEGR pump 23 to the after-treatment system 25 downstream of the DPF 63 and upstream of the electric heater 65. Similar to FIGS. 1-3, the fluid coupling between the eEGR outlet line 81 and the after-treatment system 25 (i.e., the portion of the exhaust midsection 49 extending through the after-treatment system 25) may be embodied as T pipe joint or a Y pipe joint. As a result of the MHEV 11 configuration of FIG. 4, the eEGR pump 23 directs the cold tail-pipe exhaust gases downstream of the DPF 63 for an accelerated SCR catalyst 67 heating. The increased temperature of the SCR catalyst 67 reduces the necessary capacity of the NOx adsorber 27, as the SCR catalyst 67 operates with a higher efficiency at the increased temperature. In turn, the reduced NOx adsorber 27 capacity advantageously leads to a reduced weight, a reduced cost, and a smaller packing thereof while still retaining a low NOx content as measured near the exhaust port 53. In addition, the location of the NOx adsorber 27 downstream of the after-treatment system 25 and the eEGR pump 23 advantageously improves SCR catalyst 67 warmup to its light-off temperature (i.e., approximately 200° C.) and mitigates tailpipe NOx emissions during cold ambient environment MHEV 11 operation.

Overall, FIGS. 1-4 depict various embodiments of an MHEV 11 in which low NOx exhaust gases are redistributed to various locations to further reduce NOx emissions. Each configuration presents various benefits, but the fundamental control aspects are similar insofar as each configuration is rooted in controlling functions of the NOx adsorber 27 and the eEGR pump 23, in tandem with various other components discussed above. In addition, each configuration is rooted in benefits received from further heating exhaust gases upstream of the NOx adsorber 27 and upstream of the after-treatment system 25 (or at the after-treatment system 25 in the case of FIG. 4) with recycled low NOx tailpipe emissions.

Turning to FIG. 5, FIG. 5 depicts one example of a NOx adsorber 27 including multiple NOx adsorption stages consistent with one or more embodiments of the invention as described herein. As shown in FIG. 5, the NOx adsorber 27 includes an adsorber inlet line 85 and an adsorber outlet line 87, which fluidly connect the exhaust outlet 51 to the NOx adsorber 27. The adsorber inlet line 85 is positioned upstream of the back pressure valve 71 to transfer exhaust gases from the exhaust outlet 51 to the NOx adsorber 27. On the other hand, the adsorber outlet line 87 is positioned downstream of the back pressure valve 71 to transfer exhaust gases from the NOx adsorber 27 to the exhaust outlet 51. Each of the adsorber inlet line 85 and the adsorber outlet line 87 may be formed of rigid piping or flexible hoses made from materials commonly known in the art. The adsorber inlet line 85 and the adsorber outlet line 87 serve to interconnect each stage of the NOx adsorber 27 in a parallel fluid communication fashion with the exhaust outlet 51. That is, the stages of the NOx adsorber 27 are stacked or positioned such that a single inlet line and a single outlet line fluidly couple the stages of the NOx adsorber 27 to the exhaust outlet 51.

Each stage of the NOx adsorber 27 is connected to the adsorber inlet line 85, and a NOx adsorber control valve is positioned between the NOx adsorption stage and the adsorber inlet line 85. The NOx adsorber 27 thus forms a multi stage NOx adsorber in the configuration depicted in FIG. 5. In particular, a first NOx control valve 95 is positioned in the adsorber inlet line 85 between the exhaust outlet 51 and a first NOx adsorption stage 89. A second NOx control valve 97 is disposed in the adsorber inlet line 85 between the exhaust outlet 51 and a second NOx adsorption stage 91. Similarly, a third NOx control valve is disposed in the adsorber inlet line 85 between the exhaust outlet 51 and a third NOx adsorption stage 93. The NOx control valves 95-99 are controlled by an Electronic Control Unit (ECU) (e.g., FIG. 6) as discussed further below. Descriptions included herein related to the NOx adsorber 27 may refer to a NOx adsorber 27 having multiple stages or a single stage without departing from the nature of this disclosure. Similarly, control of the adsorber control valve 73 may be facilitated with the adsorber control valve 73 in a single stage embodiment or the NOx control valves 95-99 in multi stage embodiments, such that descriptions of the adsorber control valve 73 functions are equally relevant to the NOx control valves 95-99.

Briefly, the NOx control valves 95-99 are controlled such that only one adsorption stage is fluidly connected to the exhaust outlet 51 at any given time. When a particular NOx adsorption stage is full as detected by the NOx sensor 83, then the ECU closes the NOx control valve associated with the NOx adsorption stage and opens the NOx control valve associated with the next successive NOx adsorption stage. The aperture of the back pressure valve 71 is controlled to facilitate the portion of exhaust gases diverted to the NOx adsorber 27 instead of passing out of the exhaust port 53 into the external environment. For example, if the back pressure valve 71 is fully closed then the exhaust gases are entirely diverted to the NOx adsorber 27. On the other hand, if the back pressure valve 71 is at least partially open then some or all of the exhaust gases will bypass the NOx adsorber 27. Similarly, the aperture of the flow control valve 79 is controlled to facilitate the amount of exhaust gases passed from the exhaust outlet 51 to the external environment via the exhaust port 53.

Figure 6:
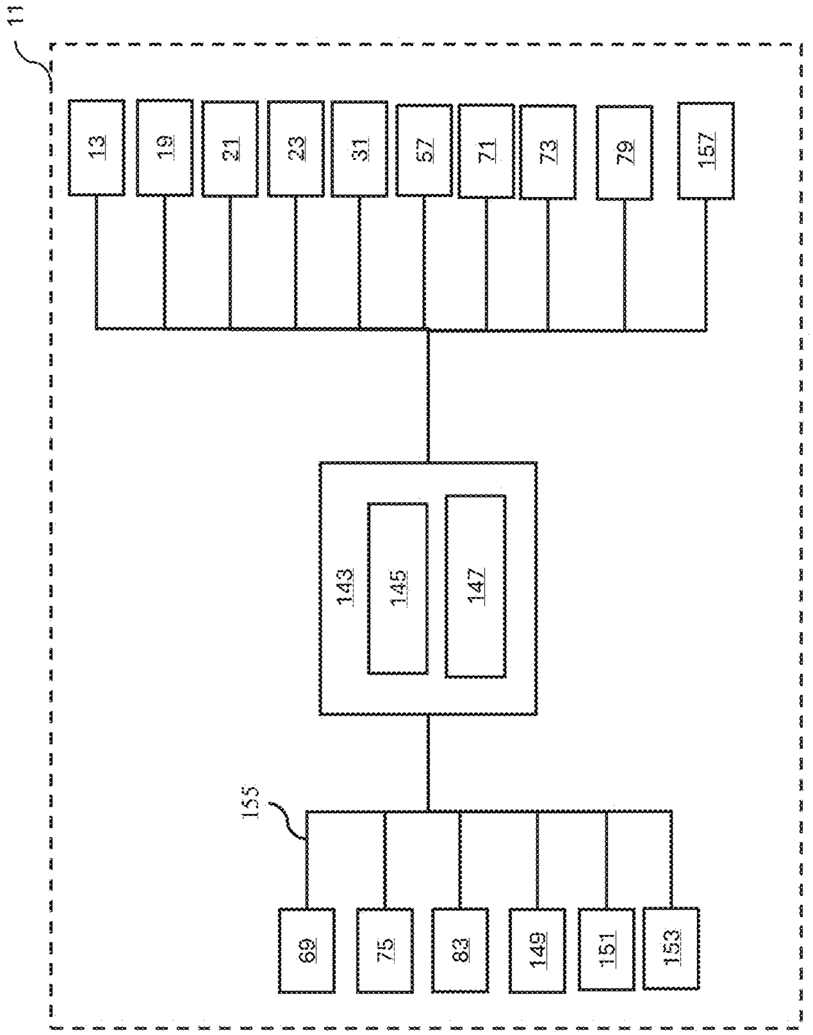
FIG. 6 depicts a block diagram of MHEV hardware in accordance with one or more embodiments of the present disclosure.

FIG. 6 depicts a hardware block diagram of an MHEV 11 in accordance with one or more embodiments of the invention as disclosed herein. More specifically, Figure depicts components electrically connected to an Electronic Control Unit (ECU) 143. As described herein, the ECU 143 is one or more processors, microprocessors, logic units, controllers, and/or integrated circuits that receive, process, and transmit commands to operate components of the MHEV 11. The ECU 143 is formed of a memory 145 and a processor 147. The memory 145 includes a non-transitory storage medium such as flash memory, a Hard Disk Drive (HDD), a solid state drive (SSD), a combination thereof, or equivalent storage devices. In relation to the invention as described herein, the memory 145 stores computer readable instructions, executed by the processor 147, that controls the various MHEV 11 hardware components described in relation to FIGS. 1-5 as discussed further below. The memory 145 further stores instructions to receive data from the various sensors described in relation to FIGS. 1-5. The processor 147 is formed by one or more processors, integrated circuits, microprocessors, or equivalent computing structures that serve to execute the computer readable instructions stored on the memory 145.

Components connected to the left-hand side of the ECU 143 in FIG. 6 are components that provide data to the ECU 143, whereas components connected to the right hand side of the ECU 143 are components controlled by the ECU 143. Components feeding data to the ECU 143 include the SCR catalyst temperature sensor 69, the adsorber temperature sensors 75, the NOx sensor 83, an oil temperature sensor 149, an accelerator pedal position sensor 151, and a brake pedal position sensor 153. On the other hand, components that are controlled by the ECU 143 include the ICE 13, the turbine 19, the eEGR pump 23, the clutch 31, the EGR valve 57, the back pressure valve 71, the adsorber control valve 73, the flow control valve 79, and a Battery Management System (BMS) 157. Each of the aforementioned MHEV 11 components are connected to the ECU 143 with a wiring harness 155, which is a series of wires, optical fibers, printed circuits, or equivalent structures and associated connectors for transmitting signals between the MHEV 11 components and the ECU 143.

Beginning with the components that feed data to the ECU 143, the SCR catalyst temperature sensor 69 is embodied as a thermistor, thermocouple, or equivalent temperature detection device that measures the temperature of the SCR catalyst 67. The SCR catalyst temperature sensor 69 is affixed or attached to the SCR catalyst 67, and data measured by the SCR catalyst temperature sensor 69 includes data of the current temperature of the SCR catalyst 67. The adsorber temperature sensors 75 are similarly formed as thermistors, thermocouples, or equivalent temperature detection devices, and each adsorber temperature sensor 75 is affixed to a corresponding stage of the NOx adsorber 27. For example, and in relation to the three stage NOx adsorber 27 depicted in FIG. 5, a first adsorber temperature sensor 75 is attached to or otherwise positioned to capture the temperature of the first NOx adsorption stage 89. Continuing with the example, second and third adsorber temperature sensors 75 capture the temperature of the second NOx adsorption stage 91 and the third NOx adsorption stage 93, respectively. Each adsorber temperature sensor 75 transmits data of the current temperature of the corresponding stage of the NOx adsorber 27.

The oil temperature sensor 149 is embodied as a measuring resistor disposed in the ICE 13. The oil temperature sensor 149 may alternatively include a thermocouple, a thermistor, or any suitable fluid temperature measurement device. The oil temperature sensor 149 may be located in or adjacent to the Main Oil Gallery (MOG) (not shown) of the ICE 13. The oil temperature sensor 149 functions to capture the temperature of oil (not shown) in the ICE 13, and temperature measurements received from the oil temperature sensor 149 are used to determine if the ICE 13 is operating in a "cold start" mode or a "warmed up" mode. As described herein, the phrase "cold start" refers to an engine operating with an oil temperature below a manufacturer or operator predetermined threshold, whereas the phrase "warmed up" refers to an engine operating with an oil temperature at or above the predetermined threshold.

The accelerator pedal position sensor 151 and the brake pedal position sensor 153 are disposed in the cabin (not shown) of the MHEV 11 and are affixed to an acceleration pedal (not shown) and a brake pedal (not shown), respectively. The accelerator pedal position sensor 151 and the brake pedal position sensor 153 each include one or more associated potentiometers that capture and transmit a resistance measurement corresponding to the actuation degree of the respective pedal. The resistance captured by the accelerator pedal position sensor 151 corresponds to a driver request for additional torque (i.e., an increased vehicle speed), whereas the resistance captured by the brake pedal position sensor 153 corresponds to a driver request for less torque (i.e., a decreased vehicle speed). The requests provided by the pedal position sensors 151, 153 are passed to the ECU 143, which controls the MHEV 11 based on the driver request as discussed further below.

Components controlled by the ECU 143 include the ICE 13. The ICE 13 is controlled by facilitating fuel injection rates of fuel injectors (not shown) positioned to inject fuel into the ICE 13. Further control over the ICE 13 is exerted by the ECU 143 controlling the aperture of the vanes of the turbine 19 and the compressor 21, which facilitates the amount of compressed air fed to the ICE 13. The ECU 143 further controls the rotation speed of the eEGR pump 23 to increase or decrease the amount of low NOx gases redirected from the exhaust outlet 51.

The clutch 31 is controlled by the ECU 143 to engage or disengage the ICE 13 and the ISG 37 from the transmission 33. For example, when the MHEV 11 is being driven the clutch 31 is directed to be engaged to transfer rotation of the crankshaft 29 to the axle 35. On the other hand, if a gear shift (not shown) is actuated by a driver of the MHEV 11 to a "neutral position" or "park" position, the clutch 31 is directed by the ECU 143 to be disengaged to prevent rotational motion of the crankshaft 29 to be transferred to the axle 35. The clutch 31 includes a friction plate (not shown) that is selectively actuated with a spring mechanism controlled by the ECU 143 to transfer rotational motion from the crankshaft 29 to the transmission 33.

The ECU 143 also controls the aperture of each of the valves of the MHEV 11. As discussed in relation to FIGS. 1-5, the control valves of the MHEV 11 include the EGR valve 57, the adsorber control valve 73, and the flow control valve 79. The EGR valve 57 is directed by the ECU 143 to actuate to a specific aperture in order to control the volumetric flow rate of exhaust gases returned to the air inlet line 43. The adsorber control valve 73 is similarly directed to actuate in order to control the ratio of exhaust gases that bypass the NOx adsorber 27, in tandem with the actuation of the adsorber control valve 73 as discussed above. In the event that the NOx adsorber 27 is embodied with multiple NOx adsorption stages, the ECU 143 controls the actuation of the NOx control valves 95-99 as well. Finally, the flow control valve 79 is controlled by the ECU 143 to facilitate the amount of exhaust gases that pass from the exhaust outlet 51 to the external environment of the MHEV 11 through the exhaust port 53.

To facilitate control over battery 17 powered components, the MHEV 11 further includes a Battery Management System (BMS) 157. The BMS 157 includes components such as sensors, relays, motor controllers, shunts, and transformers or converters that collectively function to adapt a power level provided to or received from a particular component. For example, and as discussed above in relation to FIG. 1, the battery 17 transmits and receives power to and from the ISG 37. The BMS 157 includes a starter relay (not shown) and a generator relay (not shown), which electrically connect and disconnect the ISG 37 from the battery 17 in various circuit configurations. When the starter relay is directed to be in a closed position and the generator relay is open, the ISG 37 receives power from the battery 17 and functions as a motor to rotate the gear 39, and thus the crankshaft 29. In juxtaposition, when the generator relay is closed and the starter relay is open, the ISG 37 functions as a generator to convert rotational motion siphoned from the crankshaft 29 into electrical power.

As a second example, the BMS 157 includes sensors (not shown) as mentioned above, where the sensors measure a State of Charge (SOC) and a State of Health (SOH) of the battery 17. If the BMS 157 detects an SOC lower than a manufacturer determined threshold, then the ECU 143 closes the generator relay to increase the charge level of the battery 17 using the ISG 37. Similarly, if the sensors indicate a high SOC and the MHEV 11 is operating with a low engine load, the starter relay and the generator relay of the BMS 157 may be opened to prevent the ISG 37 from taking rotational energy from the crankshaft 29. Thus, by virtue of controlling the BMS 157 and components thereof, the ECU 143 is capable of controlling the amount of power delivered to or received from each electrical component of the MHEV 11.

FIGS. 7-10 relate to methods for operating a vehicle consistent with one or more embodiments of the invention as discussed herein. Steps of the flowcharts shown in FIGS. 7-10 may be performed by an MHEV 11 as described herein, but are not limited thereto. The constituent steps of the methods depicted in FIGS. 7-10 may be performed in any logical order, and the methods are not limited to the sequences presented. Furthermore, a single step of the methods of FIGS. 7-10 may be performed with multiple actions, or multiple steps of the methods of FIGS. 7-10 may be performed in a single action without departing from the nature of this disclosure.

Figure 7:
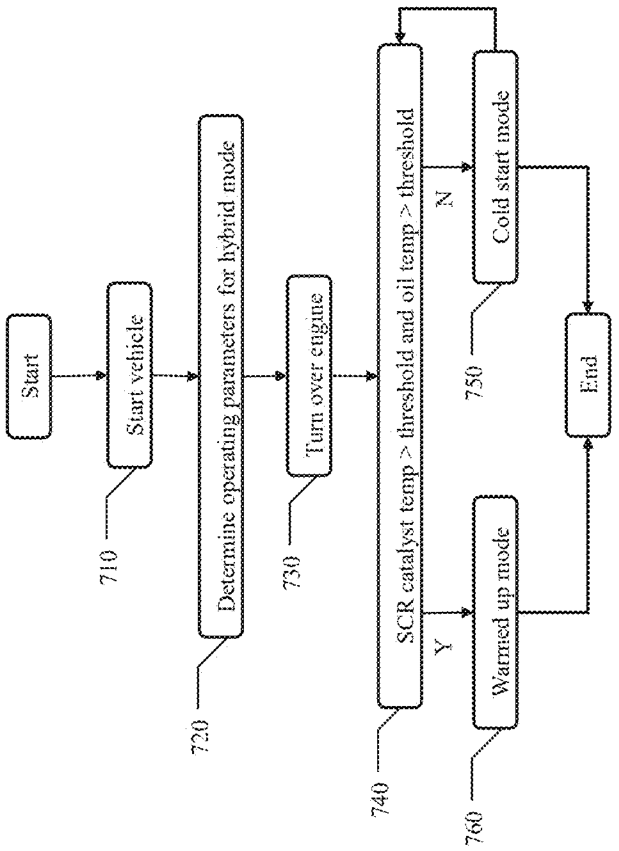
FIG. 7 depicts a flowchart of a method in accordance with one or more embodiments of the present disclosure.

The method of FIG. 7 initiates with step 710, where a vehicle such as the MHEV 11 is started. In relation to step 710, starting the MHEV 11 refers to a user entering the MHEV 11 and selecting a "drive" position of a gear shift (not shown). The user proceeds to depress the accelerator pedal (not shown), requesting torque from the MHEV 11. Within step 710, torque is provided to the axle 35 solely by the ISG 37, and the ICE 13 has not been turned over. Step 710 concludes after a predetermined time has elapsed or the user requests torque that eclipses a predetermined torque limit for driving the MHEV 11 with purely electrical power. At this point, the method proceeds to step 720 to determine an operating mode for the MHEV 11.

In step 720, operating parameters for a hybrid operating mode are determined. The operating parameters include the torque request received from the accelerator pedal position sensor 151 or the brake pedal position sensor 153, as well as battery 17 information (i.e., the SOC of the battery 17) received from the BMS 157 and operating constraints such as the current speed of the MHEV 11. Based on the aforementioned operating parameters, the ECU 143 determines a ratio of the amount of power to be provided by the ICE 13 from combustion reactions versus the amount of power to be provided by the battery 17. In the context of this disclosure, the amount of power provided by the ICE 13 may alternatively be described as "mechanical power" or "combustion provided power" without departing from the nature of this specification. Similarly, power provided by the battery 17 may be referred to as "electrical power" for the sake of distinguishing from power provided by the ICE 13. It will be appreciated, however, that both power sources are utilized to rotate the crankshaft 29 and ultimately provide rotational motion to the axle 35.

The mechanical/electrical power ratio is computed by the ECU 143 based on the torque request. The ECU 143 is biased to prefer mechanical power over electrical power, as the ICE 13 is capable of providing more power than the battery 17. The electrical power is used to supplement the mechanical power to compensate for heavy load demands, vehicle launches, and other high torque use cases. Thus, during "warmed up" ICE 13 operating cases where low loads are experienced, a majority (e.g., greater than 95%) of the rotational power may be provided by the ICE 13, with the remainder being provided by the battery 17. As noted above, the battery 17 operates at a 48 Volt (V) load with an approximate capacity of 6.8 kWh, whereas the ICE 13 has an approximate maximum power output of 150 kW.

In step 730 the ICE 13 is turned over. In this step, the ISG 37 provides torque to the crankshaft 29 of the ICE 13, causing the ICE 13 to turn over and begin an ignition cycle. As discussed above, the ISG 37 is formed of a magnetized shaft (not shown, connected to the crankshaft 29) that rotates within a coil of wire (not shown) to produce electricity or generate rotational motion. When the ISG 37 is performing functions of starting, or "turning over", the ICE 13, the ISG 37 acts as a motor that converts electrical power into rotational motion. The magnetized shaft of the ISG 37 is connected to the crankshaft 29 by way of a gear 39 that meshes with a splined portion of the crankshaft 29. Thus, when the magnetized shaft of the ISG 37 rotates the crankshaft 29 also rotates and causes the ICE 13 to initiate an ignition cycle. Once the ICE 13 has begun the first ignition cycle, the method proceeds to step 740.

In step 740, the ECU 143 compares the temperature of the SCR catalyst 67 to a predetermined heating threshold. The predetermined heating threshold for the SCR catalyst 67 may be 200 degrees Celsius (° C.), for example, although this value may vary depending on the particular configuration of the MHEV 11. The temperature of the SCR catalyst 67 is measured using an SCR catalyst temperature sensor 69 as discussed above. Simultaneously, the ECU 143 compares the oil temperature to a predetermined threshold. The predetermined threshold for the oil temperature may be 60° C., although this value may vary similar to the SCR catalyst heating temperature threshold. The oil temperature is measured using an oil temperature sensor 149.

If either or both of the SCR catalyst temperature and the oil temperature are less than their respective predetermined thresholds then the method proceeds to step 750, which represents a "cold start" operating mode. Alternatively, if both the SCR catalyst temperature and the oil temperature are greater than their respective thresholds, then the method proceeds to step 760, which represents a "warmed up" mode. Step 750 and the cold start operating mode are further discussed in relation to FIG. 8, whereas step 760 and the warmed up operating mode are discussed in relation to FIG. 9 below. After the cold start mode is initiated in step 750, the ECU 143 periodically performs checks to determine if the SCR catalyst temperature and the oil temperature are greater than their respective thresholds per step 740. If the check of step 740 is passed, the ECU 143 controls the MHEV 11 to operate in the warmed up mode per step 760. The method of FIG. 7 concludes when an operator turns off the MHEV 11, which may occur in the cold start mode if the MHEV 11 is not sufficiently warm, or in the warmed up mode if the MHEV 11 has been operational for an extended period.

Figure 8:
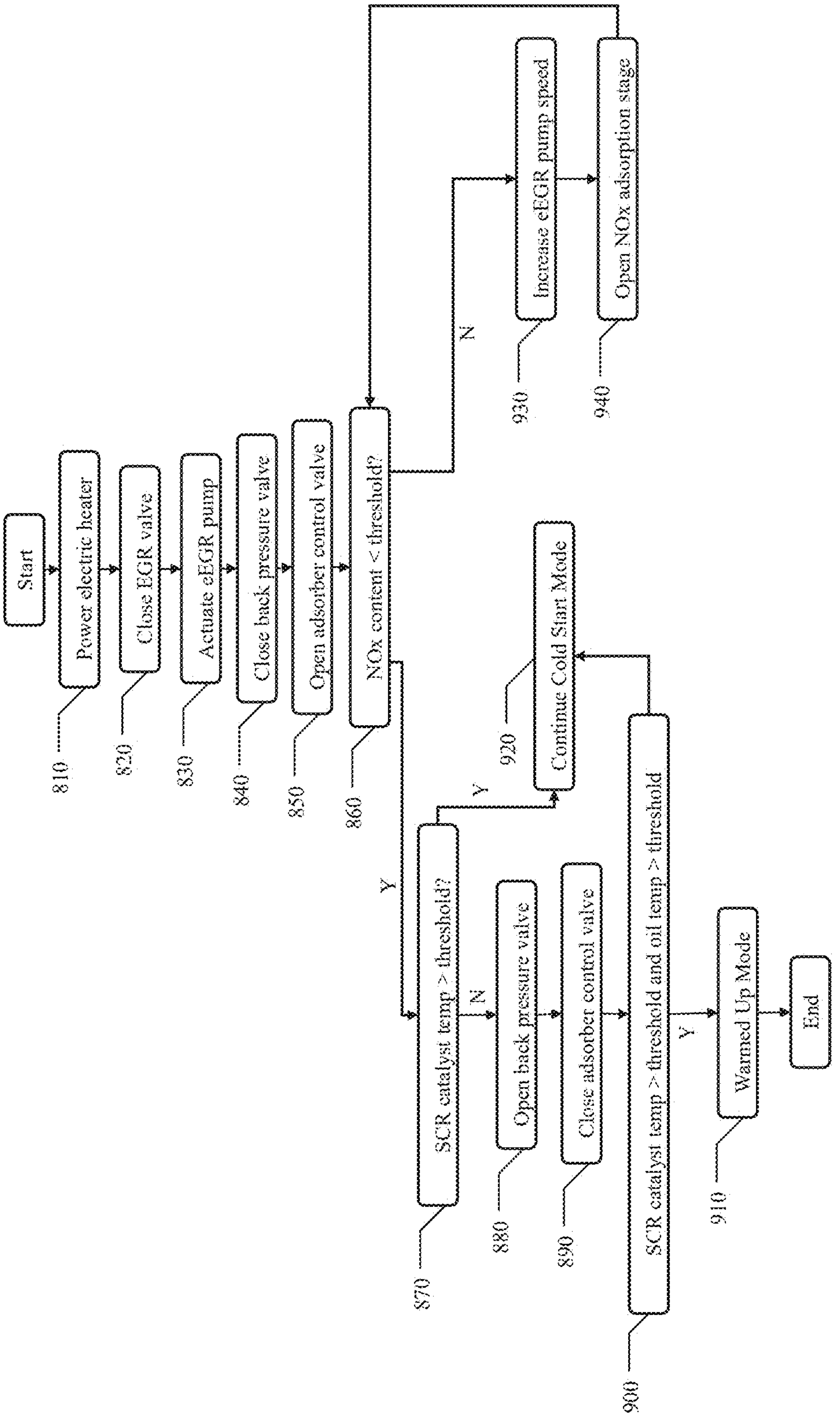
FIG. 8 depicts a flowchart of a method in accordance with one or more embodiments of the present disclosure.

Turning to FIG. 8, FIG. 8 depicts a flowchart of steps for operating an MHEV 11 in a cold start mode. The method of FIG. 8 initiates with step 810, which involves powering an electric heater 65. The electric heater 65 is fixed to or surrounds the SCR catalyst 67, and converts electrical energy to thermal energy using a resistance coil, for example. The electric heater 65 thus raises the temperature of the SCR catalyst 67 when operational, and step 810 naturally effectuates a raised SCR catalyst temperature. Once the electric heater 65 begins receiving power from the battery 17 (via relays (not shown) of the BMS 157), the method proceeds to step 820.

Step 820 involves closing the EGR valve 57 according to commands issued by the ECU 143. The closure of the EGR valve 57 routes all of the exhaust gases generated by the ICE 13 to the turbine 19 and the after-treatment system 25. Exhaust gases provided to the turbine 19 while the EGR valve 57 is closed have a heightened temperature than exhaust gases received by the turbine 19 when the EGR valve 57 is open, such that closing the EGR valve 57 retains the temperature of the exhaust gas at a heightened value. The exhaust gas flow rate is similarly retained at a heightened value due to the closure of the EGR valve 57, as the exhaust gas stream is not separated into portions. With the EGR valve 57 closed, the method proceeds to step 830.

In step 830, the eEGR pump 23 is actuated. Actuating the eEGR pump 23 avoids a NOx increase in absence of EGR by directing colder exhaust gases from the exhaust outlet 51 downstream of the NOx adsorber 27 back to the ICE 13. Actuating the eEGR pump 23 also replenishes cylinder dilution levels to avoid a NOx increase and further facilitates an ICE 13 load increase that causes an increase in the exhaust gas flow rate and the temperature thereof. Step 830 occurs simultaneously or near simultaneously with step 820, such that the EGR valve 57 is closed while the eEGR pump 23 is actuated. The method proceeds to step 840 once the eEGR pump 23 is operating and recycling exhaust gases from the exhaust outlet 51.

Step 840 includes closing the back pressure valve 71. Step 850 occurs simultaneously to step 840, and includes opening the adsorber control valve 73. Closing the back pressure valve 71 and simultaneously opening the adsorber control valve 73 diverts exhaust gases from the after-treatment system 25 directly to the NOx adsorber 27. Because cold exhaust gases have an increased NOx content than warm exhaust gases, steps 840 and 850 collectively prevent the increased NOx exhaust gases from entering the external environment of the MHEV 11. Once exhaust gases are flowing to the NOx adsorber 27, the method proceeds to step 860.

In step 860, the NOx content of the exhaust gas stream as detected by the NOx sensor 83 is compared to a predetermined NOx threshold. The predetermined NOx threshold for cold start conditions depends on the total capacity of the NOx adsorber 27, and the detected NOx content is a reflection of the remaining capacity of the active stage of the NOx adsorber 27. That is, if the stage of the NOx adsorber 27 is saturated or full, the NOx sensor 83 will output a NOx content value above the predetermined threshold. On the other hand, if the stage of the NOx adsorber 27 has at least some remaining catalytic capacity then the NOx content will be detected less than the threshold. The method proceeds to step 870 if the NOx content is less than the predetermined NOx threshold, and alternatively proceeds to step 920 if the NOx content is greater than the predetermined threshold.

Step 870 involves the ECU 143 comparing the SCR catalyst 67 temperature to the predetermined SCR catalyst temperature threshold. The predetermined threshold for the SCR catalyst 67 may be 200° C., for example, and the temperature of the SCR catalyst 67 is measured using an SCR catalyst temperature sensor 69 as discussed above. If the SCR catalyst temperature is less than or equal to the threshold, the method proceeds to step 920, where the cold start mode is continued. Otherwise, if the SCR catalyst temperature is greater than the threshold, the method of FIG. 8 proceeds to step 880.

In step 880, the back pressure valve 71 is opened by the ECU 143. Simultaneously, in step 890, the adsorber control valve 73 is closed by the ECU 143. The opening of the back pressure valve 71 and the closure of the adsorber control valve 73 allows exhaust gases to bypass the NOx adsorber 27. This returns the MHEV 11 to an initial configuration, and the process essentially reverts back to step 740 of FIG. 7 after step 890. In particular, in step 900 of FIG. 8 the ECU 143 determines if the SCR catalyst temperature and the oil temperature are lower than their respective thresholds in a similar fashion to step 740 of FIG. 7. If either check fails, the method proceeds to step 920 to continue the cold start method. Alternatively, if both the SCR catalyst temperature and the oil temperature are greater than their respective thresholds, then the method proceeds to step 910, where the warmed up mode is utilized.

As briefly noted above, step 920 relates to continuing the cold start mode. Step 920 may occur following step 870 or step 900 if the checks of either of these steps fail. Continuing the cold start mode encompasses actions such as continuing to actuate the eEGR pump 23, continuing to fill the NOx adsorber 27 with exhaust gases (if the NOx adsorber 27 is not at capacity), and/or powering the electric heater 65 to raise the SCR catalyst 67 temperature. The eEGR pump 23 speed may be varied by the ECU 143 while continuing to operate in the cold start mode, and the ECU 143 may exert control over various other components of the MHEV 11 during this step without departing from the nature of this disclosure.

Steps 930 and 940 relate to actions taken by the ECU 143 if the NOx content is detected by the NOx sensor 83 to be above the predetermined threshold therefor (i.e., the check of step 860 fails). In step 930, the rotation speed of the eEGR pump 23 is increased. Step 930 is beneficial by virtue of directing exhaust gases away from the exhaust outlet 51, which reduces the amount of NOx slip, or NOx gases that bypass the NOx adsorber 27 when the NOx adsorber 27 is full. Step 940 occurs in tandem with step 930, and involves closing the current NOx adsorber 27 stage and opening the subsequent NOx adsorption stage. For example, if the first NOx adsorption stage 89 and the second NOx adsorption stage 91 are full, the ECU 143 opens the third NOx control valve 99 to begin filling the third NOx adsorption stage 93 with exhaust gases. It is noted that step 940 is only performed in embodiments where the NOx adsorber 27 includes multiple adsorption stages, and will not be performed if the NOx adsorber 27 includes a single stage. Once a new NOx adsorption stage is opened in step 940, the method of FIG. 8 returns to step 860 to determine if the NOx content is less than the predetermined threshold therefor as discussed above. Overall, the method of FIG. 8 concludes with the MHEV 11 transitioning to the warmed up mode, and the steps of FIG. 8 assist in reducing NOx slip while the MHEV 11 is warming up.

Figure 9:
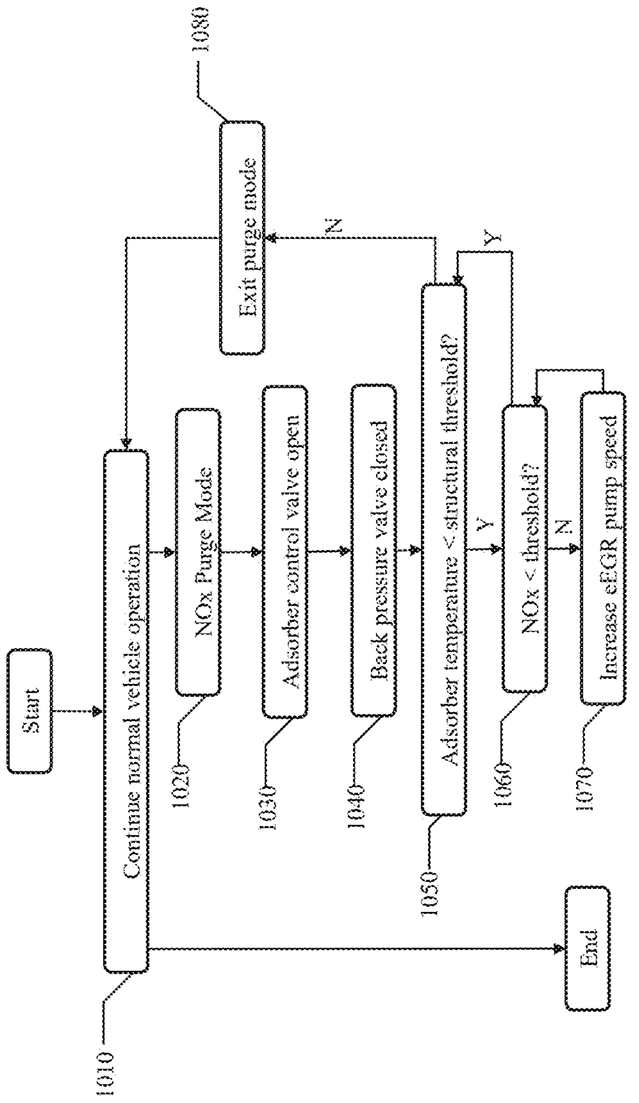
FIG. 9 depicts a flowchart of a method in accordance with one or more embodiments of the present disclosure.

Turning to FIG. 9, FIG. 9 depicts a method for operating a vehicle in a warmed up mode consistent with one or more embodiments of the invention as described herein. Steps of the method depicted in FIG. 9 may be implemented using an MHEV 11 as discussed above, but such is not strictly required to perform the method. The method of FIG. 9 begins with step 1010, which involves continuing normal MHEV 11 operations. Continuing normal MHEV 11 operations involves providing mechanical power and/or electrical power to the axle 35 using the ICE 13 and/or the ISG 37. As discussed above, the bulk of the power provided to the axle 35 is generated by the ICE 13 using combustion reactions, whereas electrical power provided by the ISG 37 is stored in the battery 17. The combustion reactions occur during a four stroke engine cycle, where the ECU 143 controls combustion related parameters (e.g., fuel injection timing) to facilitate the operation of the ICE 13.

While continuing normal MHEV 11 operations in step 1010, the ECU 143 routinely effectuates a NOx purge mode in step 1020. The determination of when to enter the NOx purge mode is made by the ECU 143 according to a variety of factors. For example, the ECU 143 may enter the NOx purge mode after filling the NOx adsorber 27 for a predetermined period of time. Alternatively, if the NOx sensor 83 indicates high NOx content (i.e., NOx content above a threshold) in the exhaust gases, then the ECU 143 may control the MHEV 11 to enter the NOx purge mode. The NOx purge mode of step 1020 includes steps 1030-1070 as discussed further below.

In step 1030, the adsorber control valve 73 is opened. Opening the adsorber control valve 73 allows NOx gases to enter the NOx adsorber 27. Simultaneously, the ECU 143 closes the back pressure valve 71 in step 1040. Because the after-treatment system 25 is warmed up, the exhaust gases downstream of the SCR catalyst 67 have a high temperature and a minimal NOx content. Directing low NOx high temperature exhaust gases to the NOx adsorber 27 removes NOx gases accumulated in the NOx adsorber 27, regenerating the capacity thereof.

While the capacity of the NOx adsorber 27 is regenerated in steps 1030 and 1040, the ECU 143 determines the efficacy of the NOx adsorber 27 by performing a series of checks in step 1050 and step 1060. Step 1050 involves comparing the NOx adsorber 27 temperature, measured with the adsorber temperature sensor(s) 75, to a maximum predetermined adsorber temperature threshold. The maximum predetermined adsorber temperature threshold reflects the temperature limit of the wash coat of the NOx adsorber 27, and is approximately 400° C. If the temperature of the NOx adsorber 27, or the active stage thereof, is less than the structural temperature threshold then the method continues to step 1060. Alternatively, if the NOx adsorber 27 temperature eclipses the structural threshold then the method of FIG. 8 exits the purge mode in step 1080 and returns to the continue normal vehicle operation in step 1010. Thus, step 1050 is rooted in determining if the NOx adsorber 27 may continue to be utilized to capture NOx emissions without detrimentally impacting the structural integrity of the NOx adsorber 27 due to high exhaust gas temperatures.

Step 1060 involves determining if the NOx content detected by the NOx sensor 83 is below an associated threshold. If the NOx content is greater than the threshold, the method continues to step 1070, where the eEGR pump 23 speed is increased to divert NOx gases that have slipped past the NOx adsorber 27 away from the exhaust outlet 51. If the NOx content is less than the threshold in step 1060, the method returns to step 1050 to check the NOx adsorber 27 temperature. A delay may be implemented between the second check of the NOx adsorber 27 temperature to avoid overtaxing the ECU 143. Thus, overall, the purge mode of the method of FIG. 8 cycles through steps 1050-1070, with the adsorber control valve 73 (or the NOx control valves 95-99) open and the back pressure valve 71 closed to continue purging NOx gases from the NOx adsorber 27. The method of FIG. 8 concludes when the driver turns off the MHEV 11, and the NOx purge mode encompassed by steps 1020-1070 of FIG. 8 may be performed any number of times over the course of a single trip.

Figure 10:
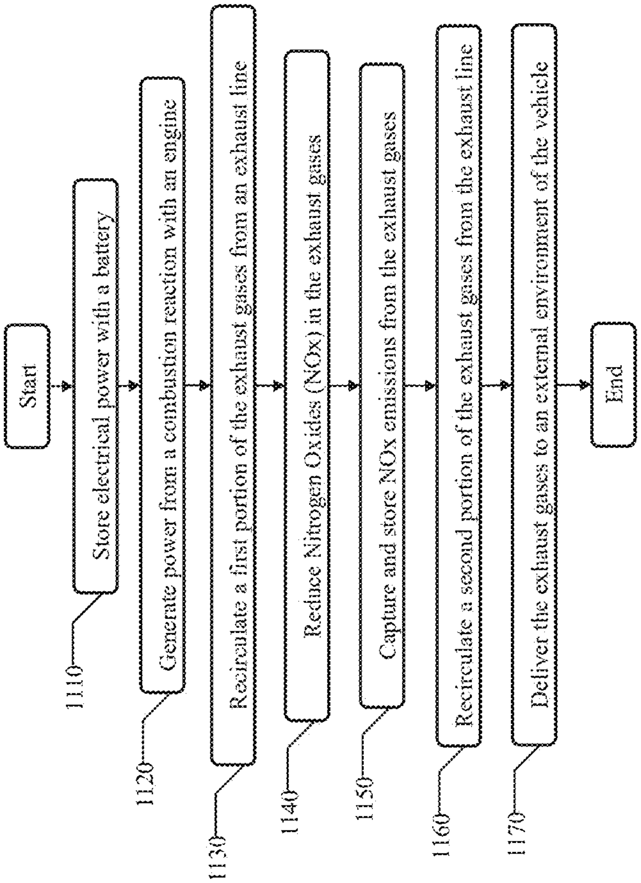
FIG. 10 depicts a flowchart of a method in accordance with one or more embodiments of the present disclosure.

Turning to FIG. 10, FIG. 10 depicts a method for operating a vehicle in accordance with one or more embodiments of the invention as described herein. The method of FIG. 10 initiates with step 1110, which involves storing electrical power with a battery 17. The battery 17 may be formed with a lithium-ion composition, a lead acid composition, a nickel-metal hydride composition, or equivalent energy storage compositions. In conjunction with an engine power output of approximately 150 kW, the battery 17 may have a capacity of approximately 6.8 kWh. The battery 17 stores power provided by a charging device (not shown) such as a charging station or a wall mounted power pack, or recovered by an ISG 37 of the MHEV 11 from the crankshaft 29.

In step 1120, the MHEV 11 generates mechanical power using the ICE 13. The ICE 13 compresses and combusts a fuel and air mixture in cylinders (not shown), where the combustion reaction drives pistons (not shown) connected to the crankshaft 29. Mechanical power provided by the ICE 13 and electrical power provided by the battery 17 are transferred to the axle 35 by way of the crankshaft 29, such that the axle 35 is rotated using power provided by the ICE 13 and the battery 17. The amount of power provided by the battery 17 is used to supplement mechanical power provided by the ICE 13, such that the bulk of the power at the axle 35 is provided by the ICE 13. The combustion reaction in the ICE 13 naturally produces exhaust gases, and the NOx content of the exhaust gases is reduced in steps 1130-1160 of the method of FIG. 10.

Step 1130 includes recirculating a first portion of exhaust gases from an exhaust line. Specifically, step 1130 includes recirculating a first portion of the exhaust gases from an exhaust inlet 47. The first portion of the exhaust gases are fed to the air inlet line 43, such that the first portion of exhaust gases dilutes a subsequent combustion reaction of the ICE 13. The diluted air fuel mixture of the subsequent combustion reaction will have a lower NOx generation when combusted, thereby reducing the overall NOx output of the MHEV 11.

In step 1140, NOx content in the exhaust gases is reduced with an after-treatment system 25. The exhaust inlet 47 and an exhaust midsection 49 are disposed upstream of the after-treatment system 25, and an exhaust outlet 51 is disposed downstream of the after-treatment system 25. The after-treatment system 25 includes a Diesel Oxidation Catalyst (DOC) 61 that oxidizes Carbon Monoxide (CO) in the exhaust gases, a Diesel Particulate Filter (DPF) 63 that removes soot from the exhaust gases, a Selective Catalytic Reduction (SCR) catalyst 67 that converts the NOx in the exhaust gases into Nitrogen (N) and water ($H_2O$). The after-treatment system 25 further includes an electric heater 65 that raises the temperature of the SCR catalyst 67. Each of the components of the after-treatment system 25 plays a separate role in reducing NOx content in the exhaust gases in order to holistically reduce NOx emissions.

Step 1150 includes capturing and storing NOx emissions from the exhaust gases. In step 1150, the NOx adsorber 27 receives the exhaust gases, and a wash coat covering a monolithic structure of the NOx adsorber 27 adsorbs NOx from the exhaust gases. The NOx adsorber 27 is fluidly coupled to the outlet portion of the exhaust line. The NOx adsorber 27 also includes an adsorber inlet line 85 fluidly connected to the exhaust outlet 51 and an adsorber outlet line 87 fluidly connected to the exhaust outlet 51. The exhaust outlet 51 thus extends between the adsorber inlet line 85 and the adsorber outlet line 87 to allow exhaust gases to bypass the NOx adsorber 27. Once the exhaust gases have passed through the NOx adsorber 27 the method proceeds to step 1160.

Step 1160 involves recirculating a second portion of the exhaust gases from the exhaust outlet 51 with an eEGR pump 23. The eEGR pump 23 operates with a power rating of less than 10 kW. The eEGR pump 23 may recirculate the low NOx exhaust gases to the air inlet line 43, to upstream of a turbine 19, to downstream of the turbine 19, or into the after-treatment system 25 downstream of the DPF 63 according to various embodiments presented in FIGS. 1-4. By recirculating the low NOx exhaust gases from the exhaust outlet 51, the MHEV 11 avoids NOx slip, where NOx gases are unintentionally passed to the external environment without being adsorbed by the NOx adsorber 27.

Ultimately, the exhaust gases are passed to the external environment of the MHEV 11 in step 1170. This step involves delivering the exhaust gases to an external environment of the MHEV 11 with an exhaust port 53 of the exhaust outlet 51. Various other steps may be implemented between steps 1160 and 1170, which may include retreating the exhaust gases with the after-treatment system 25 or purging the NOx adsorber 27 during the cold start mode as discussed above. By implementing the after-treatment system 25 and the eEGR pump 23 in the various configurations described herein, the exhaust gases passed to the external environment of the MHEV 11 have a reduced NOx content compared to typical heavy duty diesel engine vehicles.

Although only a few example embodiments have been described in detail above, those skilled in the art will readily appreciate that many modifications are possible in the example embodiments without materially departing from this invention. For example, although the disclosure describes the use of a P1 powertrain configuration, the powertrain of the vehicle may include any suitable hybrid or combustion powered powertrain while making the requisite changes. Furthermore, additional emissions control concepts such as engine block heating or forced adsorber purging using compressed gas may be implemented without departing from the nature of this disclosure. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke AIA 35 U.S.C. § 112(f) for any limitations of any of the claims herein, except for those in which the claim expressly uses the words 'means for' together with an associated function.

What is claimed is:

1. A vehicle, comprising:

an engine configured to generate power from a combustion reaction, where the combustion reaction produces exhaust gases;

a battery configured to store electrical power;

an exhaust line comprising an exhaust port configured to deliver the exhaust gases from the engine to an external environment of the vehicle;

an after-treatment system configured to reduce Nitrogen Oxides (NOx) content in the exhaust gases;

an Exhaust Gas Recirculation (EGR) line fluidly coupled to an inlet portion of the exhaust line disposed upstream of the after-treatment system and configured to recirculate a first portion of the exhaust gases from the inlet portion of the exhaust line;

an EGR pump comprising an inlet line fluidly coupled to an outlet portion of the exhaust line disposed downstream of the after-treatment system such that the EGR pump recirculates a second portion of the exhaust gases from the outlet portion of the exhaust line, and a NOx adsorber fluidly coupled to the outlet portion of the exhaust line and configured to capture and store the NOx content from the exhaust gases, wherein the NOx adsorber comprises an adsorber inlet line fluidly connected to the outlet portion of the exhaust line and an adsorber outlet line fluidly connected to the outlet portion of the exhaust line, and the outlet portion of the exhaust line extends between the adsorber inlet line and the adsorber outlet line to bypass the NOx adsorber, and wherein the inlet line of the EGR pump is fluidly coupled to the outlet portion of the exhaust line downstream of the adsorber inlet line and the adsorber outlet line such that the outlet portion of the exhaust line extends at least from the adsorber inlet line to the adsorber outlet line and to the inlet line of the EGR pump.

2. The vehicle of claim 1, wherein the EGR pump is configured to recirculate the second portion of the exhaust gases from the outlet portion of the exhaust line to the inlet portion of the exhaust line.

3. The vehicle of claim 1, further comprising a turbine positioned in the inlet portion of the exhaust line and configured to be actuated by the exhaust gases.

4. The vehicle of claim 3, wherein the EGR pump is configured to recirculate the second portion of the exhaust gases from the outlet portion of the exhaust line to a midsection of the exhaust line extending from the turbine to the after-treatment system.

5. The vehicle of claim 1, wherein the EGR pump is configured to recirculate the second portion of the exhaust gases from the outlet portion of the exhaust line to the engine.

6. The vehicle of claim 1, wherein the EGR pump is configured to recirculate the second portion of the exhaust gases from the outlet portion of the exhaust line to the after-treatment system.

7. The vehicle of claim 1, wherein the EGR pump comprises a variable speed low pressure EGR pump.

8. The vehicle of claim 1, wherein the NOx adsorber comprises a multi stage NOx adsorber that includes a plurality of NOx adsorber stages connected in parallel fluid communication with each other and the outlet portion of the exhaust line.

9. The vehicle of claim 1, wherein the NOx adsorber is connected to the outlet portion of the exhaust line.

10. The vehicle of claim 1, further comprising: a back pressure valve configured to at least partially seal the outlet portion of the exhaust line, thereby diverting the exhaust gases to the NOx adsorber.

11. The vehicle of claim 1, wherein the after-treatment system comprises:

a Diesel Oxidation Catalyst (DOC) configured to oxidize Carbon Monoxide (CO) in the exhaust gases;

a Diesel Particulate Filter (DPF) configured to remove soot from the exhaust gases;

a Selective Catalytic Reduction (SCR) catalyst configured to convert the NOx content in the exhaust gases into Nitrogen (N) and water, and an electric heater configured to raise a temperature of the SCR catalyst.

12. A method for operating a vehicle, the method comprising:

storing electrical power with a battery;

generating power from a combustion reaction with an engine, thereby producing exhaust gases;

recirculating a first portion of the exhaust gases from an inlet portion of an exhaust line with an Exhaust Gas Recirculation (EGR) line;

reducing Nitrogen Oxides (NOx) content in the exhaust gases with an after-treatment system, where the inlet portion of the exhaust line is disposed upstream of the after-treatment system and an outlet portion of the exhaust line is disposed downstream of the after-treatment system;

capturing and storing NOx content from the exhaust gases with a NOx adsorber fluidly coupled to the outlet portion of the exhaust line, wherein the NOx adsorber comprises an adsorber inlet line fluidly connected to the outlet portion of the exhaust line and an adsorber outlet line fluidly connected to the outlet portion of the exhaust line, and the outlet portion of the exhaust line extends between the adsorber inlet line and the adsorber outlet line to bypass the NOx adsorber;

recirculating a second portion of the exhaust gases from the outlet portion of the exhaust line with an EGR pump having an inlet line, and delivering the exhaust gases to an external environment of the vehicle with an exhaust port of the exhaust line, wherein the method further comprises fluidly coupling the inlet line of the EGR pump to the outlet portion of the exhaust line downstream of the adsorber inlet line and the adsorber outlet line such that the outlet portion of the exhaust line extends at least from the adsorber inlet line to the adsorber outlet line and to the inlet line of the EGR pump.

13. The method of claim 12, further comprising: recirculating the second portion of the exhaust gases with the EGR pump from the outlet portion of the exhaust line to the inlet portion of the exhaust line.

14. The method of claim 12, further comprising: actuating a turbine positioned in the inlet portion of the exhaust line with the exhaust gases.

15. The method of claim 14, further comprising: recirculating the second portion of the exhaust gases with the EGR pump from the outlet portion of the exhaust line to a midsection of the exhaust line extending from the turbine to the after-treatment system.

16. The method of claim 12, further comprising: recirculating the exhaust gases from the outlet portion of the exhaust line to the engine with the EGR pump.

17. The method of claim 12, further comprising: recirculating the second portion of the exhaust gases with the EGR pump from the outlet portion of the exhaust line to the after-treatment system.

18. The method of claim 12, further comprising: connecting the NOx adsorber to the outlet portion of the exhaust line.

19. The method of claim 12, further comprising: at least partially sealing the outlet portion of the exhaust line with a back pressure valve and diverting the exhaust gases to the NOx adsorber.

20. The method of claim 12, further comprising: connecting a plurality of NOx adsorber stages in parallel fluid communication with each other and the outlet portion of the exhaust line such that the NOx adsorber comprises a multi stage NOx adsorber.

* * * * *